United States Patent [19]

Welschof

[11] Patent Number: 4,861,316
[45] Date of Patent: Aug. 29, 1989

[54] CONSTANT VELOCITY UNIVERSAL BALL JOINT

[75] Inventor: Hans-Heinrich Welschof, Offenbach am Main, Fed. Rep. of Germany

[73] Assignee: Löhr & Bromkamp GmbH, Offenbach am Main, Fed. Rep. of Germany

[21] Appl. No.: 61,869

[22] Filed: Jun. 11, 1987

[30] Foreign Application Priority Data

Jun. 11, 1986 [DE] Fed. Rep. of Germany ....... 3619693

[51] Int. Cl.$^4$ .............................................. F16D 3/23
[52] U.S. Cl. ...................................... 464/145; 464/906
[58] Field of Search ................................ 464/145, 906

[56] References Cited

U.S. PATENT DOCUMENTS 3,879,960  4/1975  Welschof et al. ..................... 464/145
4,188,803  2/1980  Otsuka et al. ........................ 464/145
4,698,047 10/1987  Welschof et al. ..................... 464/145

FOREIGN PATENT DOCUMENTS 125343  9/1979  Japan ................................... 464/145

Primary Examiner—Daniel P. Stodola
Attorney, Agent, or Firm—Toren, McGeady & Associates

[57] ABSTRACT

A ball-type constant velocity universal joint has a plurality of axially extending circumferentially spaced tracks in its inner and outer joint members. Balls in a ball cage engaged between the tracks of the inner and outer members. Runouts or extensions of the ball tracks are under load in a deflected position of the joint, and deviate in an asymmetrical manner from each other in cross-section, in an undeflected position of the joint, with reference to the center point of a ball in that track. This makes it possible in a preferred manner to fabricate the ball tracks of the one joint member which is free of undercuts, by means of a non-cutting shaping process, and to fabricate the ball tracks in the other joint member which is uniformly curved by a cutting machining process, particularly by grinding with swivelling motion of the joint member. Thus, high fabrication accuracy of an entire series of joints can be achieved also in case of large tolerances in the fabrication of the ball tracks of the one joint member produced by non-cutting fabrication. This high fabrication accuracy can be achieved by individual grinding of the ball tracks of the second joint member.

4 Claims, 1 Drawing Sheet

CONSTANT VELOCITY UNIVERSAL BALL JOINT

FIELD AND BACKGROUND OF THE INVENTION

The present invention relates in general to constant velocity universal ball joints, and in particular, to a new and useful universal ball joint which has an outer member, an inner member, a ball cage mounted for rotation between said inner and outer members, and a plurality of torque-transmitting balls captured in said ball cage and mounted for rolling between said inner and outer members.

In constant velocity universal ball joints, it is usual to form the ball tracks or races in the inner and outer ball members, to have a cross-section which is symmetrical across their entire length, when the joint is an undeflected position with respect to the center of the balls. This is done to provide favorable deflection angles and so that the least possible amount of machining is necessary.

If the requirements concerning the deflection angle of the joint are reduced, there is a corresponding reduction in the axial length of the joint members or the lengths of the ball trace regions to be machined.

The machining of the ball tracks or races occurs, as a rule, mechanically in the known joints, particularly by grinding, or by reshaping without cutting. While this avoids excessive expense, only ball tracks that are free of undercuts are possible in the outer joint member, and ball tracks which have equidirectionally reduced center distances are possible in the inner joint member.

A disadvantage in the fabrication of such joints with ball tracks that are free of undercuts and which are produced by reshaping, lies in that a sorting of the joint members must be accomplished prior to assembly. This is because of relatively poor observance of selected dimensional requirements for the joint members. Even after this sorting operation, however, tolerance fluctuations still occur within a specific range. The grinding, or also, only a regrinding of at least one of the joint members which is free of the undercuts or of joint members with equidirectionally reduced axial distance, is, however, frought with considerable difficulty since the required track courses cannot be produced at justifiable expense. As a rule these tracks are composed of circular arcs and straight lines.

SUMMARY OF THE INVENTION

Proceeding from the above problems, the present invention provides a constant velocity universal ball joint, in which the amount of mechanical machining processes is reduced when compared with joints having exclusively mechanically machined ball tracks and the mechanical machining processes, to the extent that they are required, are simplified and the joints are more easily fabricated. Another feature of the invention, which makes a process available for fabrication of constant velocity universal rotating joints in large numbers, permits a tightening of the tolerances in the joints at a justifiable expense and which is reduced when compared to previous processes.

The solution of the present invention is characterized by the track runouts of the inner joint member lying on the outside of the ball tracks, being under load if the joint is deflected, and also those of the outer joint member deviating in cross-section in an asymmetrical manner from each other with the joint in the undeflected position, with respect to the ball center point. A more advanced solution consists in a process in which, to start off with, the ball tracks including the track runouts of the one joint member are produced to be free from undercuts, by non-cutting shaping, and secondly the ball tracks including the track runouts of the other joint member are manufactured by a grinding process, especially one using shaping in arc fashion with swivelling motion of the joint member.

The invention provides the possibility of manufacturing one of the joint members, be it the outer joint member or the inner joint member, by a non-cutting process free of undercuts, wherein the fabrication and tooling costs can be lowered. Especially if one abandons extreme angles of inclination, the corresponding second joint member, be it the inner joint member or the outer joint member, can be fabricated in the region of the ball tracks on a simple grinding apparatus, which in particular need not produce any complicated track shapes, since the stationary tools the workpiece can be swivelled around a fixed center.

The track shape of the joint member manufactured by a non-cutting shaping can, in a preferred manner, consist of a longitudinal section having a circular arc-shaped segment, and a contiguous straight line (axial) segment. The track shape of the mechanically machined joint member can extend in a cross-section preferably purely in a circular arc shape. In order to reduce the tolerances with simultaneous reduction of the fabrication costs, each joint member fabricated by non-cutting processes can be individually paired with a dimensionally accurate joint member machined mechanically. The joint part produced by non-cutting shaping can be, for instance, taken from fabrication series for which, if larger joint angular deflections are required, matching parts can be selectably manufactured by complicated fabrication processes with track courses that are symmetrical over their entire length.

Objects of the present invention thus include the provision of a constant velocity universal ball joint which is simple in design, rugged in construction and economical to manufacture.

Another object of the invention is to provide a process for producing a constant velocity universal ball joint which is simplified and economical.

The various features of novelty which characterize the invention are pointed with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
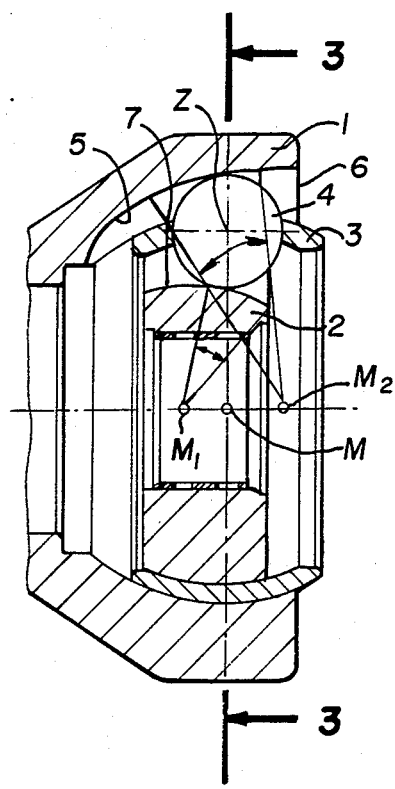
FIG. 1 is an axial sectional view of a joint with ball tracks that are free of undercuts in the outer joint member and circular arc-shaped ball tracks with a reduced center distance on both sides, in the inner joint member.

Referring to the drawings in particular, the invention embodied therein comprises a constant velocity universal ball joint having inner and outer joint members which are pivotally connected to each other by a plurality of circumferentially spaced balls 4 which are held in a ball cage 3, and which ride in circumferentially spaced axially extending outer and inner ball tracks or races 5 and 7.

FIG. 1 shows a joint comprising an outer joint member 1, an inner joint member or spherical hub 2, the ball cage 3 and the plurality of balls 4 that are guided by the ball cage. The outer member 1 is depicted in axial cross-section toward the side of a shaft connection (not shown). The inner member 2 has inner splinting (not shown) and connecting means for a shaft trunnion (not shown). The outer ball tracks or races 5, one of which is depicted in the upper half section of the outer member 1, are free of undercuts when viewed from the opening plane 6 of the outer member. That is, the races 5 are constructed partially as a circular arc having a center of curvature $M_2$, lying in a plane which is offset axially in a first direction from the joint center M and thus are particularly suited for non-cutting shaping (e.g. molding). The ball tracks or races 7 of the inner joint member 2, on the other hand, are constructed to have a circularly arc-shaped base with a curved extent proceeding on both sides from a joint having the greatest distance from the axis of the joint passing through center M. The center of curvature $M_1$ of races 7 lie in a plan offset axially in the opposite direction from the joint center point M and can thus be produced in a preferred manner by metal cutting fabrication, particularly grinding with swivelling motion of the workpiece. The above-mentioned track shapes refer repsectively to the track base depicted in the upper half section of FIG. 1. It is evident in the drawing that a symmetry between the tracks and the center points Z of the balls exists in the depicted extended position of the joint only over a partial region of the ball tracks 5 and 7. This region extends over about 20° of pivoting for the joint, centered on its axially aligned position. That is an angle of about 10° to either side of a central radial plane passing through center point M and lying transversely to the axis of the joint. The middle portions of tracks 5 and 7 that are symmetrical are shown by the solid angles in FIG. 1. The runout or end portions of each track beyond the solid angles are asymmetrical.

Figure 2:
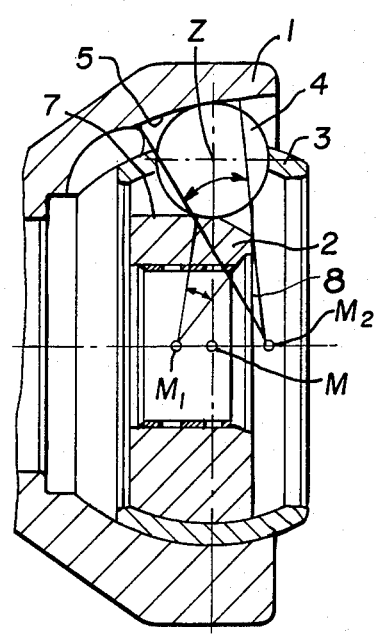
FIG. 2 is an axial sectional view of another joint with ball tracks having a constant curvature in cross-section in the outer joint member and ball tracks consisting of a straight line segment and a curved segment in the inner joint member.
Figure 3:
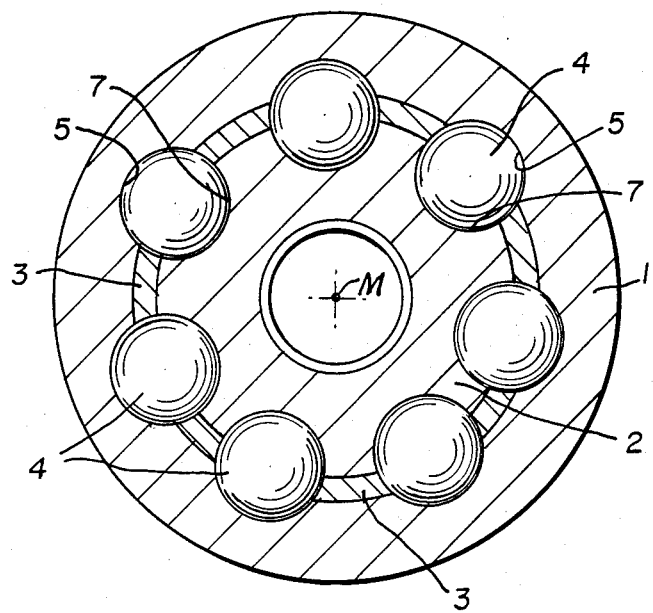
FIG. 3 is a radial sectional view taken along line 3—3 of FIG. 1.

A joint comprising an outer joint member 1, an inner joint member 2, a ball cage 3 and torque-transmitting balls 4 is shown in FIG. 2 where the same reference numerals are used to designate the same or similar parts. This embodiment of the invention essentially coincides with that in FIG. 1. In FIG. 2, however, the ball track 7 in the inner joint member 2 is shown to be free of undercuts when viewed from the outer plane 8 of the inner joint member 2. The track base, closest to plane 8, consists herein of a circular arc, whose center of curvature $M_1$, lies in a first plane axially offset with respect to the joint center point M, as well as of a straight inner adjacent thereto in a tangential manner. Herein the manufacture of the ball track 7 in the joint inner member 2 is possible in a favorable way by a non-cutting shaping. Compared to that the ball track 5 in the outer joint member 1 of FIG. 2 is produced exclusively by a circular arc referred to the track base, whose center of curvature $M_2$ lies in a plane offset counter to the first plane with respect to the joint center point M. Recesses adjoining the circular arc on both sides produce discontinuities and thus are not part of the ball track 5. It is also evident here that the symmetry of the tracks referred to the ball center points Z exists in the depicted extended or axially aligned position of the joint only across a partial region of the ball tracks 5 and 7 (e.g. 20°).

Basically a non-cutting manufacture of the ball track in the outer joint member 1 would also be possible in the embodiment of FIG. 2, however, in order to observe the desired tolerances in this case also as in the embodiment of FIG. 1, the ball tracks of one of the joint members, namely those of the outer joint member 1 with the exclusively circular arc-shaped ball tracks are to be fabricated by a grinding process.

Each of the tracks 5 and 7 thus have other ends (adjacent the opening planes 6 and 8 in FIGS. 1 and 2) with the axial cross-sectional shape of the tracks and runouts being asymmetrical with respect to the center of a ball held between the tracks, the runouts being under load in a deflected position of the joint where the inner and outer members are not axially aligned, the asymmetry for the runouts existing when the joint is undeflected, that is the inner and outer members are axially aligned.

While specific embodiments of the invention have been shown and described in detail to illustrate the application of the principles of the invention, it will be understood that the invention may be embodied otherwise without departing from such principles.

What is claimed is:

1. A constant velocity universal joint, comprising:
   an outer joint member having an inner surface with a plurality of axially extending circumferentially spaced outer tracks;
   an inner joint member having an outer surface with a plurality of axially extending circumferentially spaced inner tracks;
   a ball cage between said inner and outer joint members; and
   a plurality of balls retained in said cage, each ball having a center and being engaged for rolling between said outer and inner tracks for permitting pivoting between said inner and outer members between an axially aligned undeflected position between said members, and an axially offset maximum deflected position between said members;
   each track having a middle portion which is regularly impacted by said balls under load between the undeflected and maximum deflected positions of said inner and outer joint members, each track also having runout portions which are impacted by said balls for assembling reasons only when said inner and outer joint members are deflected beyond the maximum deflected position, said middle portions of said inner and outer tracks for each ball being symmetrical with respect to the center of that ball between the undeflected and maximum deflected positions of said inner and outer members, said runout portions for said inner and outer tracks of each ball being asymmetrical with respect to the center of that ball in the undeflected position of said inner and outer members;
   at least one of the inner and outer tracks of said inner and outer members being free of undercuts whereby said at least one of said inner and outer members can be produced by non-cutting shaping.

2. A joint according to claim 1, wherein each of said tracks of said outer joint member have an axial cross-section formed from at least one of arcs and straight line, and being free of undercuts as viewed from said runout portions of said outer tracks, said tracks of said inner joint member having a circular arc shaped axial cross-section with a point having a maximum diameter from the axis of said joint, and having a reducing diameter in each axial direction away from said point of maximum diameter.

3. A joint according to claim 2, wherein said tracks of said inner and outer joint members have axial cross-sections which are symmetrical within a central angle of about 20° from said undeflected position to said maximum deflected position of said joint.

4. A joint according to claim 3, wherein said tracks of said inner and outer joint members each have arc shaped portions with centers of curvature lying on the axis of said joint, said centers of said ball lying on a central radial plane of the joint, said center of curvature of said inner track being on one side of said central plane and said center of curvature of said outer track being on an opposite side of said central plane.

* * * * *